July 16, 1957  B. J. TRAYCOFF  2,799,050
MOLDING APPARATUS
Filed Nov. 4, 1954  3 Sheets-Sheet 1
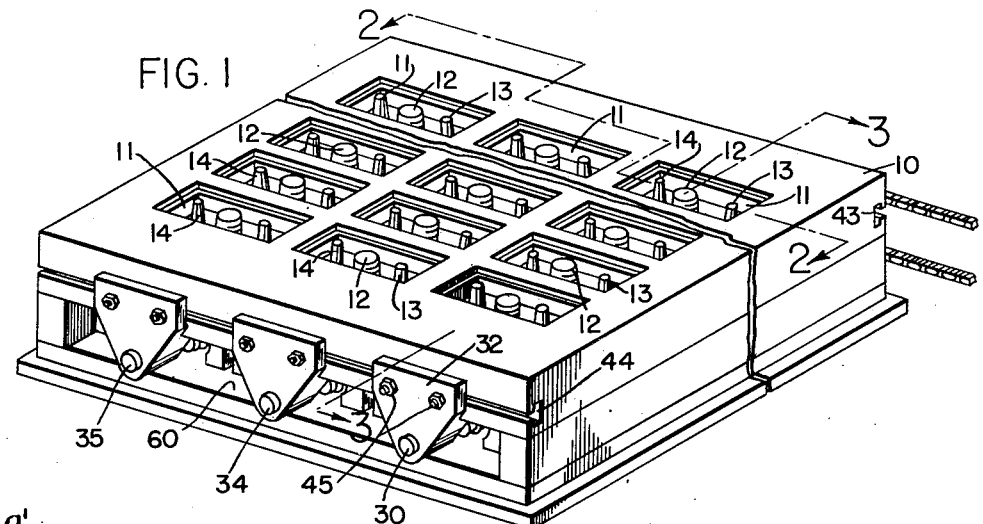
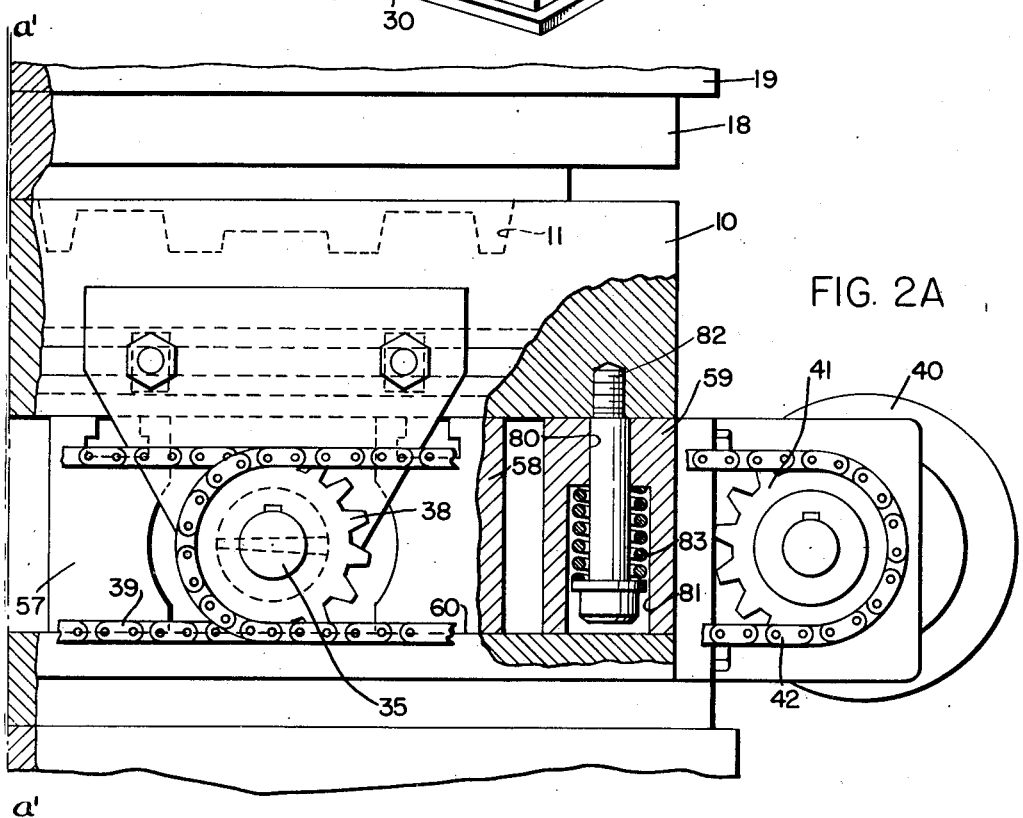
INVENTOR.
BORIS J. TRAYCOFF
BY
Oldham & Oldham
ATTORNEYS July 16, 1957  B. J. TRAYCOFF  2,799,050
MOLDING APPARATUS
Filed Nov. 4, 1954  3 Sheets-Sheet 2

INVENTOR.
BORIS J. TRAYCOFF
BY
Oldham & Oldham
ATTORNEYS.

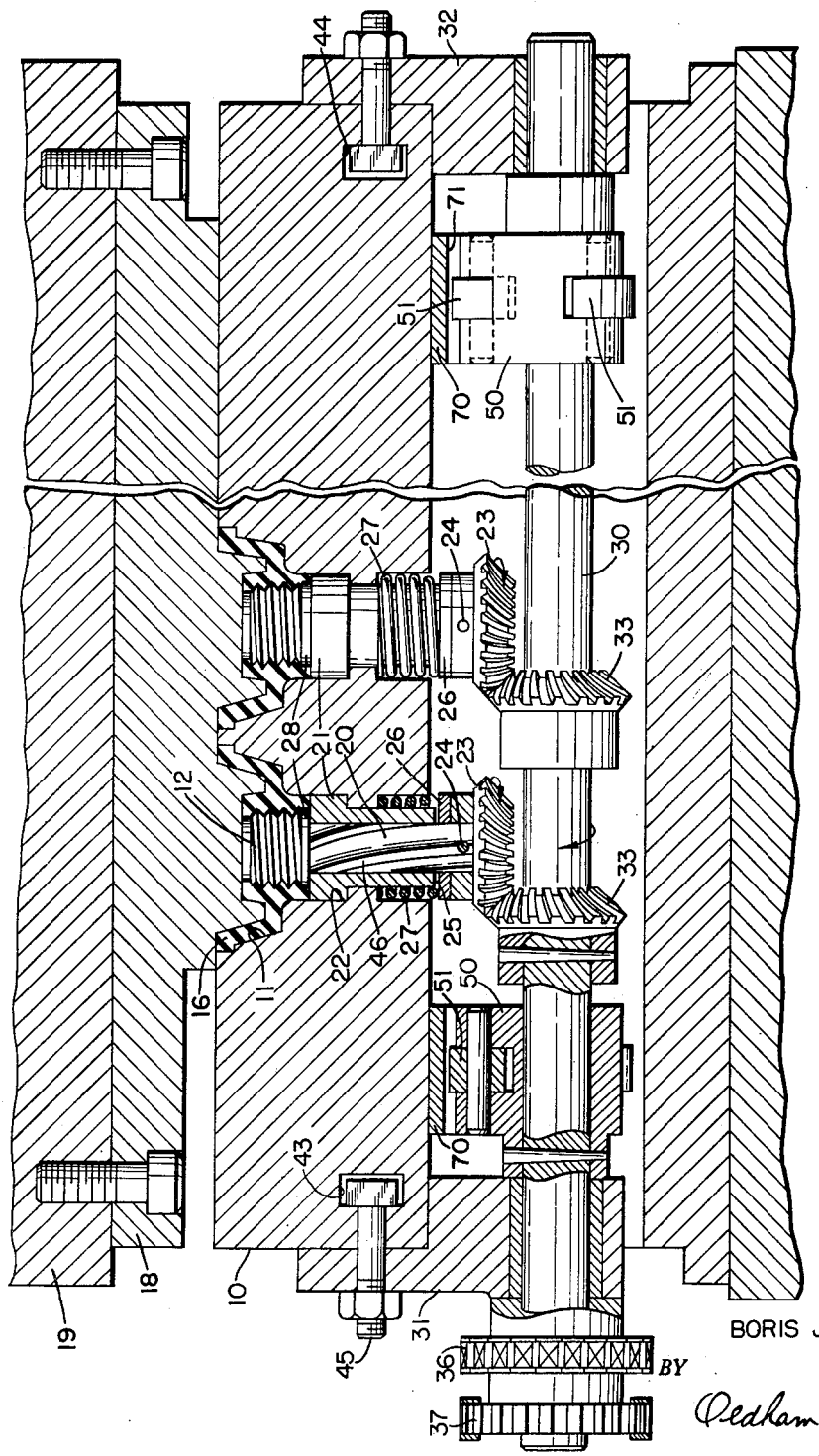

United States Patent Office 2,799,050
Patented July 16, 1957

2,799,050

MOLDING APPARATUS

Boris J. Traycoff, Kent, Ohio

Application November 4, 1954, Serial No. 466,762

10 Claims. (Cl. 18—42)

This invention relates to molding apparatus and more particularly to apparatus for molding cover plates for storage battery cells of hard rubber or other hard rubber articles having threaded openings. The invention is especially useful when threaded cores must be removed by rotation from molded articles and the articles must be loosened from the molds.

In the manufacture of substantially rigid molded articles of hard rubber or plastic materials having threaded openings, it has been the custom to provide loose threaded cores which would be removed from the mold with the article and then could be screwed out of the article. Such a procedure involves considerable labor cost and the handling of the cores damages them so that they must be replaced frequently. Such a method also requires that the cores be accurately made so as to be interchangeable.

The problem of removing the threaded cores from the articles while the articles are in place in a mold also presents difficulties as it requires relative axial movement of the threaded core and the article with liability of the article hanging in the mold cavity and causing damage thereto.

As articles such as battery cell covers are made in a variety of sizes with different arrangements and spacing of terminal and threaded filler openings, the provision of equipment for removing threaded cores from the articles by rotation presents a problem of provision of such mechanism on each mold or provision of core manipulating mechanism for handling a variety of mold arrangements.

The present invention has for an object the overcoming of the foregoing difficulties by provision of core manipulating mechanism adjustable to molds of different arrangement and dimensions.

Another object of the invention is the provision of power operated mechanism for simultaneously rotating the threaded cores in a multiplicity of mold cavities.

A further object is to provide for loosening the articles from the mold cavities while removing the threaded cores from the articles.

Still a further object is to withdraw terminal cores from the articles while simultaneously rotating the threaded filler opening cores therefrom.

These and other objects will appear from the following description and the accompanying drawings.

Of the drawings:

Fig. 1 is a perspective view of a lower mold plate for forming a multiplicity of battery cell cover plates with apparatus constructed in accordance with the invention secured thereto, the upper mold plate not being shown;

Fig. 2a is a continuation of Fig. 2 partially in elevation and partially broken away and in section; and Fig. 3 is a sectional view taken on line 3—3 of Fig. 1, also showing the upper mold member in section on the same plane.

Figure 2:
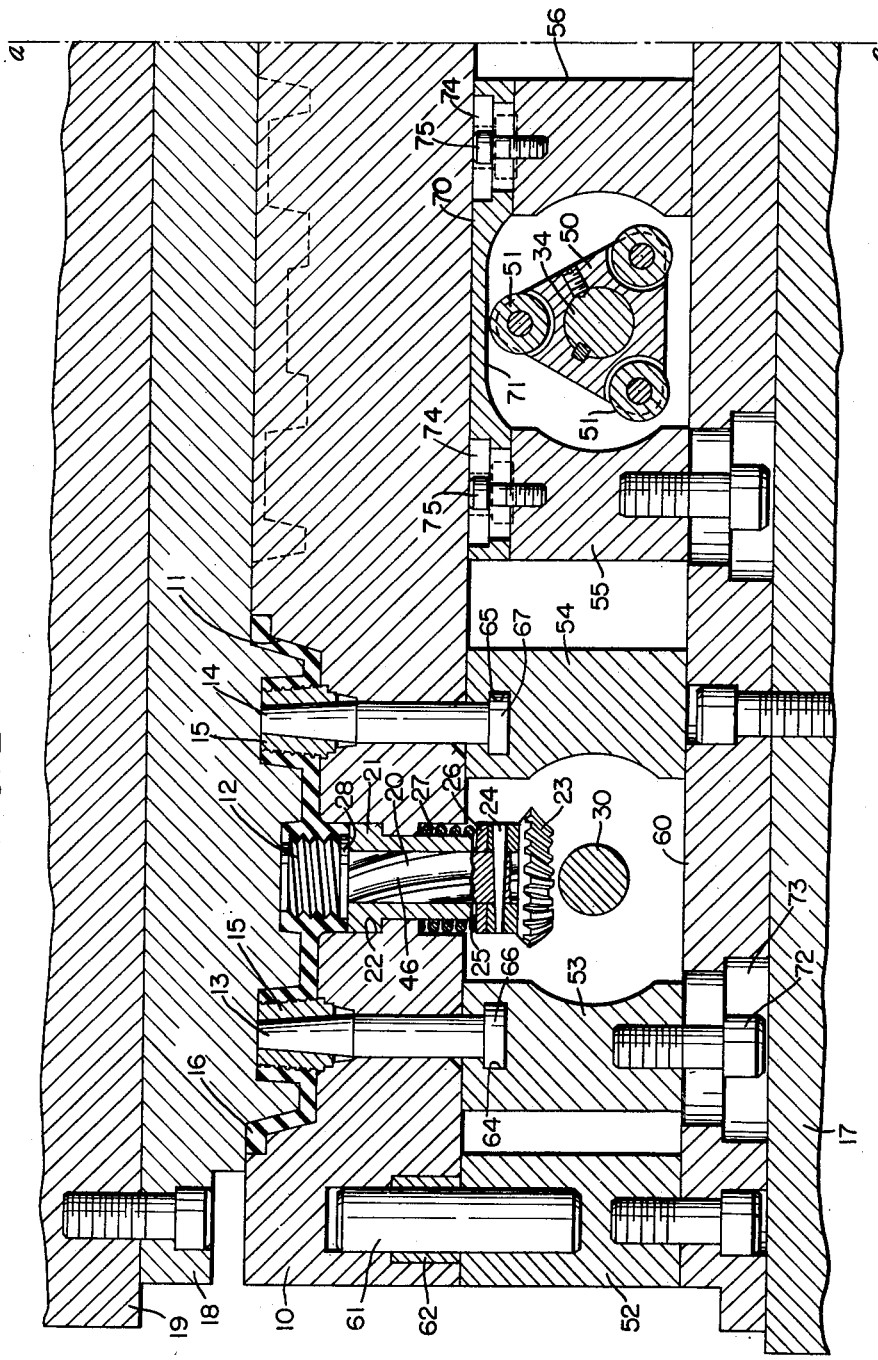
Fig. 2 is a sectional view thereof taken on line 2—2 of Fig. 1 and also showing the upper mold member and one of the molded articles in section in the same plane.

Referring to the drawings, the numeral 10 designates a lower mold member comprising a plate having a multiplicity of mold cavities 11 formed therein, each cavity having a threaded core 12 mounted therein for forming a filler opening and a pair of tapered cores 13, 14 for locating lead bushings 15 to be molded into the covers 16, as shown in section in Fig. 2. The mold member 10 is mounted on the lower platen 17 of a molding press, as hereinafter described, for cooperation with an upper mold member 18 mounted on the upper platen 19 of the press, to complete the mold cavity 11, as shown in Fig. 2. As shown in Fig. 1, the mold members contain a multiplicity of cavities arranged in parallel rows in two directions and any number of similar articles may be simultaneously molded within the capacity of the press and the dimensions of the mold members and the articles to be formed.

The invention contemplates the provision of means for rotating all of the threaded cores 12 simultaneously to screw them out of the molded articles and to assist in removing the molded articles from their mold cavities. For this purpose, each threaded core 12 has an integral shank 20 which extends through a bushing 21 and is rotatably mounted in the bore thereof, the bushing 21 being mounted in a shouldered bore 22 formed in the mold member 10. A miter gear 23 is secured to the shank 20, as by a taper pin 24 at a position slightly spaced from bushing 21, as at 25, so as to permit about three thirty-seconds end play of the threaded core 12. A thrust washer 26 is loosely mounted about the shank 20 against the gear 23 and a compression coil spring 27 is mounted about the bushing 21 between the thrust washer 26 and the mold member 10 in a counterbore provided therefor to normally hold the threaded core in its lowermost position where a shoulder 28 of the core seats against the upper face of the bushing 21.

Mounted below the mold member 10 in alignment with each row of threaded cores 12 are rotatable shafts such as shaft 30 which is suspended in bearing brackets 31, 32 from the mold member 10 with its axis parallel to the mold member.

At each miter gear 23 along the axis of the shaft 30, a mating miter gear 33 is secured to the shaft for meshing with the corresponding gear 23. Shaft 30 and the similar shafts 34, 35 are adapted to be rotated in unison, and for this purpose sprockets 36, 37 are secured to shaft 30. Similar sprockets such as 38 are secured to shafts 34, 35 and the sprockets on adjacent parallel shafts are engaged by chains, such as 39. All of the shafts 30, 34, 35 may be driven in unison from a common source, such as a gear reduction motor 40 having a sprocket 41 thereon for driving a chain 42 engaging one of the sprockets, such as 38.

To provide for interchangeability of mold members 10 with the threaded core rotating apparatus especially where the spacing of the rows of threaded cores is different in different mold members, the mold members 10 are formed with T-slots 43, 44 at opposite edge faces and bearing brackets 31, 32 are fitted to and adjustably positioned in these slots by bolts 45 engaging in the T-slots.

To provide an end thrust to the threaded cores 12 for urging them outwardly of the mold cavities 11 against the compressed springs 27 and thereby ejecting the molded articles from the cavities, gears 23 and 33 are formed with helicoidal teeth with the teeth of gear 33 extending counterclockwise from the axis of the gear radially outward thereof looking along the axis from the apex of the tooth cone toward its base. As the shaft 30 rotates in the direction indicated in Fig. 3 by the arrow its thrust tends to move the gear 23 upwardly while imparting counterclockwise rotation thereto to rotate the core 12 in a direction to back its right-hand thread out of the molded article. The space 25 permits the raising of the gear 23 three thirty seconds of an inch and the gear teeth are sufficiently deep to permit such movement without the teeth litfing out of the mesh.

To avoid freezing of the shank of the screw threaded core 13 in the bushing 21 due to flow of plastic molding material therebetween under molding pressure, the shank 20 is formed with helical flutes 46 of left-hand helix and relatively wider than the lands therebetween. During rotation of the core 12, the shank is rotated in a counterclockwise direction as viewed from below in Fig. 3, and this forces any plastic material between the shank 20 and bushing 21 downwardly and out through the space 25.

For drawing out the cores 13, 14 simultaneous with screwing of the threaded cores from the article and thereby avoiding hanging of the article on these pins while at the same time imparting some vibration to the articles to assist in releasing them, a series of cams 50 are mounted on the shafts 30, 34, 35 and are rotatable therewith. Each cam 50, as seen in Fig. 2, comprises a generally triangular body having cam rollers 51 mounted at its corners. The mold member 10 is supported by a multiplicity of parallel spacer bars 52, 53, 54, 55, 56, 57, 58, 59 which in turn are secured to a base plate 60 secured to the lower platen 17 of the press. The end bars 52, 59 are provided with guide pins 61 adapted to enter guide bushings 62 of the mold member 10. Certain of the spacer bars, such as 53, 54 underlie rows of cores 13, 14 and have T-slots 64, 65 extending lengthwise thereof for receiving enlarged heads 66, 67 of the cores 13, 14 respectively. The arrangement is such that mold member 10 and with its shafts 30, 34, 35 and their cams 50 may be oscillated vertically on the guide pins 61 while the core pins 13, 14 are held against such vertical movement.

At positions overlying the cams 50, bridging cam bars 70 are provided to span the adjacent spacing bars, as for example, bars 55, 56 in Fig. 2. The cam surfaces 71 are so positioned as to clear the cam rollers 51 when the mold member 10 is resting on the spacing bars as shown, but when the mold member 10 is raised above the spacing bars, the rollers 51 will strike the cam surfaces and force the mold downwardly. In the lowered position of mold member 10, resting upon the spacing bars, the rollers 51 will strike the plate 60 and force mold member 10 upwardly. Due to the triangular form of the cams 50, the rollers 51 being equally spaced about their axis in equilateral triangular formation, no roller can strike cam bar 70 without the other tow rollers on the cam clearing plate 60 and vice versa. The arrangement is such that simultaneous with rotation of the shafts to rotate the threaded cores, the mold member is raised and lowered to withdraw the cores 13, 14 and impart a reciprocating movement to the mold.

To provide for adjustment of the apparatus to accommodate molds having different spacings of the mold pins 13, 14 relative to each other and relative to the threaded core 12, the spacing bars 53 to 58 are adjustably secured to the plate 60, and for this purpose the bars are secured by machine screws 72 passing through elongate slots 73 in the plate 60. Also the cam bars 70 have elongate slots 74 for receiving screws 75 which permit their being secured to the spacing bars at different spacings thereof.

For holding the mold member 10 normally against the spacing bars, the end bars 52, 59 are formed with vertical holes 80 having counterbores 81. Machine screws 82 are slidably mounted in the holes 80 with their heads within the counterbores 81 and are threaded into tapped openings in the mold member 10. Coil compression springs 83 are mounted about the screws between their heads and the counterbore shoulders under compression.

While the shafts 30, 34, 35 have been described as driven by a gear reduction motor 40, these shafts may be driven by another power means, as for example by some rotated member of the molding press in which the mold is mounted.

In the operation of the apparatus, with the molding press open and the mold member 10 resting on its supports and the shafts 30, 34, 35 not rotating, lead bushings 15, 16 are placed on the cores 13, 14 and a quantity of moldable rubber composition is placed in each cavity of mold member 10. The press is then closed and heat and pressure applied to mold and vulcanize the articles. The press is then opened and the motor 40 is started rotating shafts 30, 34 and 35. As the shafts rotate, rollers 51 on the cams 50 strike the plate 60, thereby raising the mold member 10 and with it the shafts 30, 34, 35 relative to the mold pins 13, 14 and the supporting spacer bars. Simultaneously the screw threaded cores 12 are rotated to screw them out of the articles and to push the articles from the mold cavities, the helical teeth of the gears 23 assisting in providing thrust for this purpose. Upon continued rotation of the shafts, rollers 51 contact cam bars 70 and force the mold member 10 back down to its original position.

Variations may be made without departing from the scope of the invention as it is defined by the following claims.

What is claimed is:

1. Molding apparatus comprising a mold member formed with mold cavities, screw threaded cores mounted within said mold cavities for rotation, said cores having shanks extending through said mold member, and means for rotating said shanks for removing the cores from molded articles, said shanks having helical grooves therein for conveying scrap molding material overflowing said cavities.

2. Molding apparatus comprising a mold member formed with mold cavities, screw threaded cores mounted within said mold cavities for rotation, said cores having shanks extending through said mold member, means for rotating said shanks for removing the cores from molded articles, said shanks having helical grooves therein for conveying scrap molding material overflowing said cavities, and said cores being mounted in said mold member for limited axial movement and coil springs being provided for restraining such axial movement.

3. Molding apparatus for manipulating cores extending through a mold member from mold cavities therein, said apparatus comprising a support for the mold member, adjustable means on said support for anchoring mold cores, rotatable means associated with said mold for rotating certain of the cores, and means on said core rotating means and engaging said support during rotation thereof to provide relative movement of said mold member with said support for simultaneously withdrawing other of said cores.

4. Molding apparatus for manipulating cores extending through a mold member from mold cavities therein, said apparatus comprising a support for the mold member, adjustable rotatable means on said support for anchoring mold cores, means associated with said mold for rotating certain of the cores, and means on said core rotating means and engaging said support during rotation thereof to provide relative movement of said mold member with said support for simultaneously withdrawing other of said cores, and said last named means comprising rotatable cams on said core-rotating means and cam followers on said support.

5. Molding apparatus for manipulating cores extending through a mold member from mold cavities therein, said apparatus comprising a support for the mold member, adjustable means on said support for anchoring mold cores, rotatable means associated with said mold for rotating certain of the cores, and means on said core rotating means and engaging said support intermittently during rotation thereof to provide relative movement of said mold member with said support for simultaneously withdrawing other of said cores, and said last named means comprising rotatable cams on said core-rotating means and cam followers on said support, said cam followers effecting a vertical reciprocating movement of the mold member.

6. Molding apparatus comprising a mold member having mold cavities, axially movable cores extending through said mold from said cavities, screw threaded rotatable cores in said cavities extending through said mold member, and a single rotatable core manipulating mechanism for simultaneously effecting axial movement of the first said cores and rotating movement of the screw threaded cores for removing them from a molded article in one of said cavities.

7. Molding apparatus comprising a mold member having mold cavities, axially movable cores extending through said mold from said cavities, screw threaded rotatable cores in said cavities extending through said mold member, and a single rotatable core manipulating mechanism for simultaneously effecting axial movement of the first said cores and rotating movement of the screw threaded cores for removing them from a molded article in one of said cavities, and said core manipulating mechanism including a support for said mold member and rotatable means on said mold member engageable with said support for effecting axial movement of said cores relative to said mold member.

8. Molding apparatus for manipulating cores extending through a mold member from mold cavities therein, said apparatus comprising a support for a mold member, said support having means for anchoring cores extending through said mold member against axial movement relative to said support, and means on said support for raising and lowering said mold member relative to said support and said cores and last named means comprising vertically spaced cam surfaces on said support, and a power operated triangular cam rotatably supported by said mold member for rotation between said cam surfaces and alternately engaging them to provide a reciprocating motion of said mold member.

9. Molding apparatus for forming battery cover plates, said apparatus comprising a mold plate having at least one cover plate cavity therein, apertures through said plate at such cavity for receiving lead bushing pins, lead bushing pins extending into said cavity through said apertures, and means for oscillating said plate axially of said pins to loosen an article in said cavity from said pins said oscillating means comprising a rotatable cam journalled for rotation on said mold plate and a support for said plate anchoring said pins and having cam surfaces engageable by said cam during its rotation to move the mold plate toward and from said support.

10. Molding apparatus for forming battery cover plates, said apparatus comprising a mold plate having cover plate cavities and apertures through said plate at said cavities, lead bushing pins extending through said mold plate apertures into said cavities, means for anchoring said pins, and means including said anchoring means for providing an oscillating movement of said mold plate axial of said pins to loosen articles in said cavities from said pins said last named means comprising a rotatable cam journalled for rotation on said mold plate and cam surfaces on said pin anchoring means engageable with said cam during its rotation to move the mold plate toward and from said support.

References Cited in the file of this patent
UNITED STATES PATENTS

| | | |
|---|---|---|
| 1,944,571 | Rahm | Jan. 23, 1934 |
| 2,015,647 | Martindell | Sept. 24, 1935 |
| 2,336,423 | Reiser | Dec. 23, 1939 |
| 2,391,527 | Tracy | Feb. 11, 1943 |
| 2,514,486 | Green | July 11, 1950 |